GATING CIRCUITS

Filed May 29, 1950

INVENTOR
W. H. MAC WILLIAMS, JR
BY
H. A. Burgess
ATTORNEY

INVENTOR
W. H. MAC WILLIAMS, JR.
BY
H. A. Burgess
ATTORNEY

Jan. 27, 1953 W. H. MacWILLIAMS, JR 2,627,039

GATING CIRCUITS

Filed May 29, 1950 4 Sheets-Sheet 3

INVENTOR
W. H. MAC WILLIAMS, JR.
BY
H. A. Burgess
ATTORNEY

Jan. 27, 1953 W. H. MacWILLIAMS, JR 2,627,039

GATING CIRCUITS

Filed May 29, 1950 4 Sheets-Sheet 4

INVENTOR
W. H. MAC WILLIAMS, JR.
BY
H. A. Burgess
ATTORNEY

Patented Jan. 27, 1953

2,627,039

UNITED STATES PATENT OFFICE 2,627,039

GATING CIRCUITS

Walter H. MacWilliams, Jr., Summit, N. J., assignor to Bell Telephone Laboratories, Incorporated, New York, N. Y., a corporation of New York Application May 29, 1950, Serial No. 165,053

23 Claims. (Cl. 307—88)

This invention relates to novel types of electrical gating or control circuits for enabling applied currents to exert selective control over output currents.

A feature of the invention is the use of surface-state devices as the control elements in circuits of this type, an example of such devices being the transistor.

It is an object of the invention to gate an electrical signal and at the same time to amplify the signal being gated.

It is a further object of the invention to selectively control currents in any of *n* output circuits by currents in any of *m* input circuits. More specifically, it is an object to provide a high speed amplifying matrix for simultaneously connecting up to the number of *m* or *n*, whichever is smaller, pairs of input and output circuits. It is a further object to provide such a matrix having no more than $m+n$ gating elements which can connect a similar number of input and output circuits substantially simultaneously.

It is also an object of the invention to provide a broad-band high speed amplifying gating means capable of passing, for example, either audio-frequency signals or microsecond pulses.

Another object of the invention is to represent simple logical equations electronically.

It is also an object of the invention to provide transistor circuits for accomplishing the aforegoing objects.

Transistors, as they are now known, are disclosed, for example, in Patent 2,524,035, which was granted on October 3, 1950, to J. Bardeen and W. H. Brattain. Briefly, a transistor in one of its forms comprises a small block of semiconductor material, such as N-type germanium, with which are associated three electrodes. One of these, known as the base electrode, makes low-resistance contact with one face of the block. The others, known respectively as the emitter and collector, preferably make rectifier contact with the block.

The emitter is normally biased so as to conduct in the forward or low-resistance direction, i. e., it is biased positive with respect to the base, and the collector is biased with the opposite polarity so as to conduct in the high-resistance or reverse direction. As is now well-known, if a signal voltage is applied between the emitter and base, an amplified replica thereof will appear across the load connected in the collector circuit. And, as is more fully disclosed in the above-mentioned Bardeen-Brattain patent, increments of signal current which flow in the circuit of the collector electrode as a result of the signal current increments which flow in the circuit of the emitter electrode exceed the latter in magnitude. Transistors of the type just described are now known as point contact or type A, N-type. This current amplification feature has become the general rule and appears in nearly all transistors of this type fabricated.

Herein, a gate or switch will be considered "on" if it is in a condition to allow energy fed into it to result in energy flowing out of it, and "off" when its condition does not allow input energy to result in a flow of energy into an output circuit.

In accordance with one embodiment of the present invention described hereinafter in detail, an elemental gate, comprising a transistor, is turned "off" by biasing the emitter electrode sufficiently negative with respect to the base so that the collector current is substantially unaffected by changes in emitter current. A transistor so biased is said to be in a non-transconducting state. The gate is turned "on" by increasing the negative emitter current in a positive sense so that changes in emitter current will appear in amplified form as appreciable changes in collector current; that is, the transistor is in a transconducting state. The equivalent emitter-to-base resistance of a typical type A transistor is on the order of 500 ohms in the open or transconducting state and on the order of 15,000 ohms in the closed or non-transconducting state so that a non-trans-conducting transistor has negligible loading effect on an input signal.

An elemental gate in the computer art is an electronic equivalent of a logical two-term "and" circuit since a signal will be present in the collector circuit if a signal is applied to the emitter "and" if the transistor is placed in a transconducting state. In the matrix configuration, paralleling the collector circuits (with capacitive coupling, so as not to disturb the collector biasing) by columns results in combining the outputs of the individual collectors into an "or" circuit, since a signal will appear in the paralleled circuit if a signal is present in the output of the transistor of the first row of that column "or" the second row, "or" the third row etc. A characteristic of the "and" circuit as described is the high input impedance of the gating point. A logical "and" circuit with more than two terms may therefore be obtained by connecting several elemental gates in tandem since a succeeding transistor will reflect only a small load into the collector circuit of the preceding transistor.

The properties of transistors make them advantageous for switching purposes. For example, they will pass pulses on the order of 1 microsecond in duration without appreciable delay or undue distortion and will amplify the pulse being passed. Also their broad-band characteristic permits them to gate and amplify, for example, either audio-frequency signals or pulse-modulated signals at pulse repetition frequencies of 10 kilocycles or more. By proper adjustment of bias voltages they may be made to serve as rectifiers or limiters in addition to serving as amplifying gates. Further, the rectifier action of the emitter electrode gives a transistor gate an inherently high "off/on" ratio.

These and other features of the present invention will be better understood from a consideration of the following detailed description taken in accordance with the attached drawings in which.

Transistors are inherently current devices as compared, for example, to vacuum tubes which are essentially voltage devices. The static characteristics of transistors are therefore usually expressed with current as the independent variable and voltage as the dependent variable. The relation between the collector voltage and the emitter current is termed the "forward" characteristic and is shown, for several values of collector current in Fig. 1A for a typical type A transistor. The slope of any particular curve at any particular value of emitter current is the transresistance of the transistor for those values of emitter and collector current. A load line, or, dynamic characteristic, curve $a$ for a collector bias of —90 volts and a series resistor of 27,000 ohms is also shown.

It may be seen that for values of emitter current less than zero, i. e., negative emitter currents, the slope of the characteristics is substantially zero. In this region of negative emitter current, changes in emitter current will effect little or no change in the collector voltage and a transistor so biased is said to be in a non-transconducting state. Referring specifically for illustrative purposes to the load line, curve $a$, it may be seen that if the emitter current remains more negative than approximately —.1 milliampere, the collector voltage will be substantially constant. If however, the transistor is biased so that no current whatsoever flows in the emitter circuit, it may be seen that an increase in the emitter current of but 1 milliampere would effect a change in collector current of approximately 30 volts.

Figure 1A:
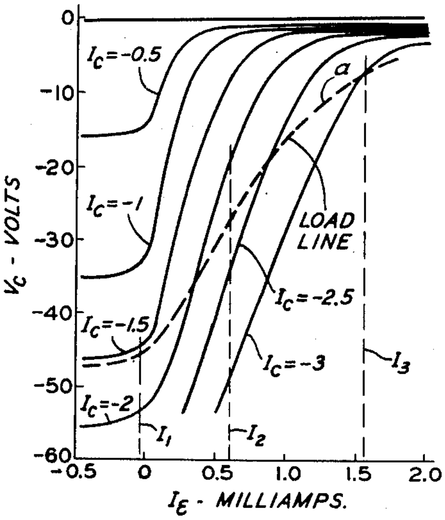
Figs. 1A and 1B are characteristic curves of a typical type A transistor.
Figure 1B:
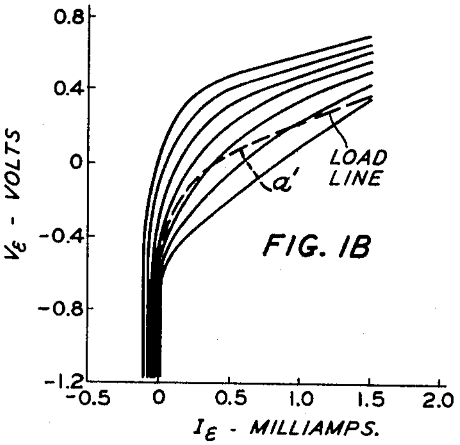

The relation between the emitter voltage and the emitter current is known as the "input" characteristic. A group of input characteristics for various values of collector current is shown in Fig. 1B as well as the dynamic characteristic, curve $a'$; corresponding to curve $a$ of Fig. 1A, and the slope of these curves is proportional to the input impedance, for constant collector current. It may be seen from these curves that the input resistance of a transistor biased in the non-transconducting state is very high so that a very small emitter current results from any given applied voltage. The principles discussed in connection with the characteristics shown in Figs. 1A and 1B are utilized in the present invention.

Figure 2:
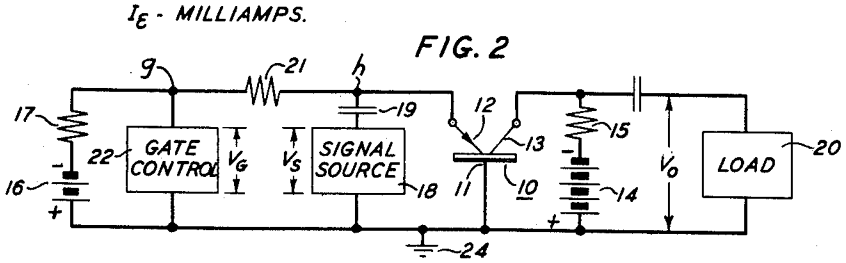
Fig. 2 shows in schematic an elemental gate in accordance with the present invention.

Referring now to Fig. 2, an elemental gate, or switch as it may alternatively be termed, comprises a transistor 10 having a base electrode 11, an emitter electrode 12 and a collector electrode 13. The collector 13, which makes rectifier contact with the block of semiconductor material is biased negatively with respect to the base 11 by the battery 14 and biasing resistor 15 so as to conduct in the reverse direction, which is the normal manner for amplification. The emitter 12 is also biased negatively with respect to the base 11 by the battery 16 and biasing resistor 17 so as to conduct only in the reverse direction, which is the opposite of the normal connection for amplification. The battery 16 therefore places the transistor in a non-transconducting state. Energy to be gated is supplied to the gate input by the source 18 which is connected to the emitter 12 through a blocking condenser 19 but does not pass to the load 20 as long as the battery 16 holds the transistor in a non-transconducting state. The battery 16 causes negative current to flow in the emitter circuit in an amount determined by the voltage of battery 16 and the series resistance of resistors 17 and 21 and the large emitter-to-base resistance of the transistor 10 which is in a non-transconducting state. The values of resistors 17 and 21 are chosen so that energy from the source 18 will not produce positive emitter current and hence will not produce an appreciable change in collector voltage.

The gate is turned "on" by placing the transistor in a transconducting state. This is accomplished by means of the gate control 22 which applies a voltage $V_g$ in shunt with the battery 16 and resistor 17 and increases the negative emitter current sufficiently in a positive sense so that energy from the source 18 will appear in amplified form as a voltage drop across the resistor 15 and load 20. As the voltage $V_g$ of the gate control 22 is increased positively with respect to the voltage of battery 16, the negative emitter current will also be increased in a positive sense until at some value of $V_g$ the emitter current will be at a value $I_1$ in the region of the knee of the load line, curve $a$, of Fig. 1A. With an emitter current on the order of $I_1$, the transistor 10 is in a transconducting state since any further increases in emitter current will effect an appreciable change in the collector voltage as may be seen from curve $a$. For example, a positive voltage $V_s$ from the source 18 will now cause a positive current to flow in the emitter circuit by reason of the small dynamic emitter-to-base resistance of the transistor 10 and the positive voltage will appear in amplified form as a voltage drop across resistor 15 and the load 20.

Figures 3, 5:
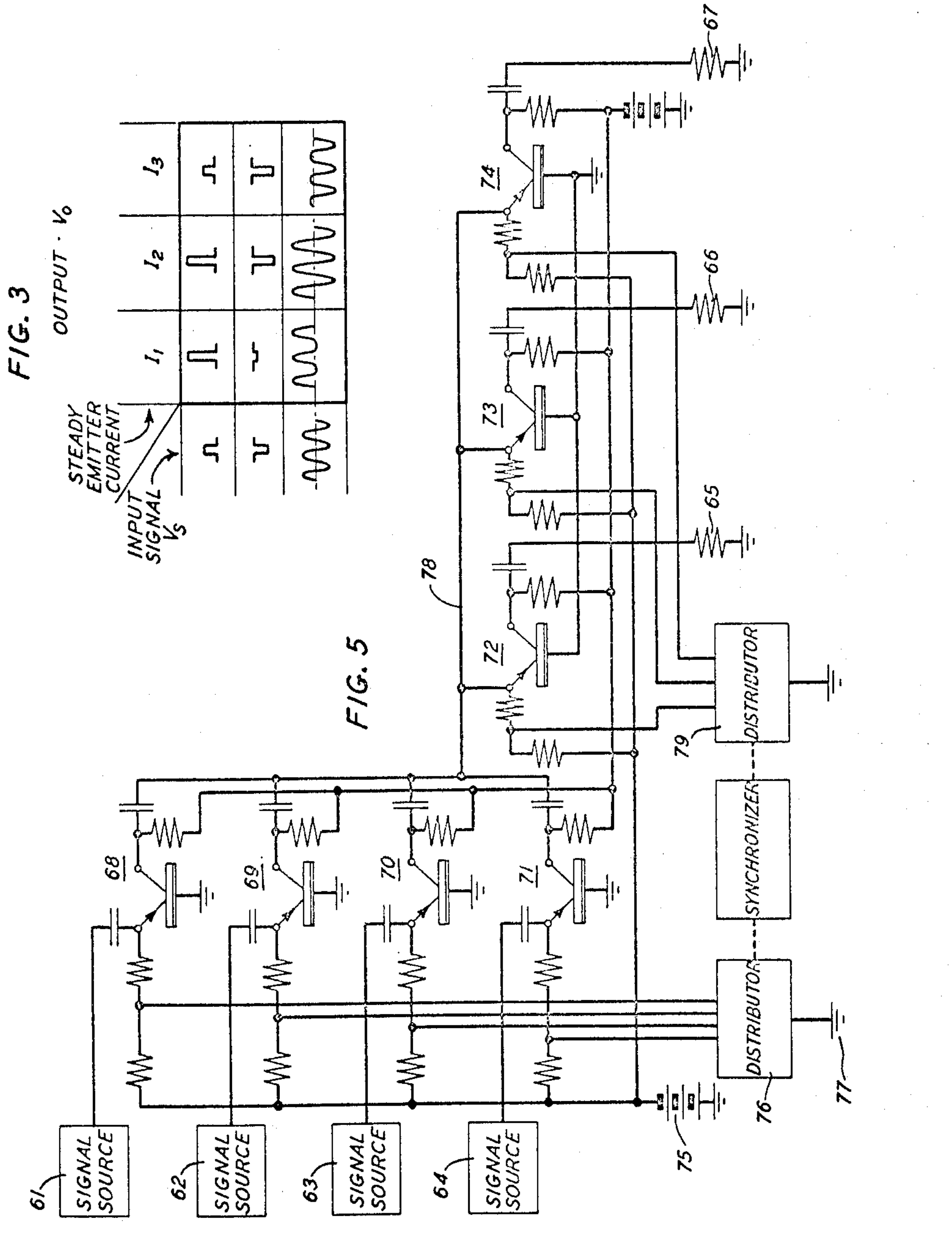
Fig. 3 shows diagrams descriptive of the present invention.
Fig. 5 shows in similar form an $m$ by $n$ switching matrix comprising only $m+n$ elemental gates.

Referring now to Fig. 3, when the steady emitter current is on the order of $I_1$ and the transistor input $V_s$ from source 18 is a positive pulse, the output $V_0$ at the load will be an amplified positive pulse. If, however, the input is a negative pulse there will be practically no change in the voltage across the load 20 as may be readily seen from the curves of Fig. 1A. Further, if the input to the gate is an alternating current for example, either an audio signal or a radio-frequency pulse, only the positive peaks in amplified form, will appear at the load due to the rectification by the emitter electrode.

If the emitter current is increased to a value $I_2$ which lies approximately in the center of the straight line portion of the load line *a*, positive pulse, negative pulse and alternating-current inputs to the gate will appear at the load 20 as illustrated in Fig. 3 under $I_2$. In a similar manner, if the emitter current is further increased to a value $I_3$ in the region of curve *a*, where further positive increases in emitter current cause progressively smaller increases in collector voltage, the negative pulses and negative half cycles of the alternating input will be gated and amplified to an extent appreciably greater than positive inputs.

Figure 2A:
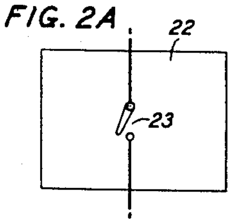
Figs. 2A through 2E illustrate various modifications of the gate of Fig. 2.

The first condition illustrated by Fig. 3 wherein the emitter current is increased to a value $I_1$ may be obtained as illustrated by the modification shown in Fig. 2A since $I_1$ is approximately zero emitter current. The negative bias 16 is effectively disabled by closing the switch 23 which applies ground from 24 to the gating point *g* and reduces the emitter current to substantially zero. The second condition illustrated may be obtained by the modification shown in Fig. 2B. Instead of a ground as in Fig. 2A a positive voltage is applied to the gating point *g* from the battery 25 through the variable resistor 26 when the switch 23 is closed. This modification is especially useful in gating alternating signals for example, audio-frequency signals. The third condition illustrated may be obtained by a proper adjustment of resistor 26 so that the steady emitter current will be increased to the value $I_3$ when the switch 23 is closed.

It should be noted that when the gate is turned "on" by increasing the emitter current to approximately $I_1$, the gating signal itself is not passed to the load but merely places the gate in a state such that the energy from source 18 will be passed. It should be further noted that input signals are subjected to a negative limiting action due to the flat slope of the forward characteristic for values of emitter current below $I_1$. The positive limiting effect is not as pronounced but will increase with increasing emitter current.

Figure 2B:
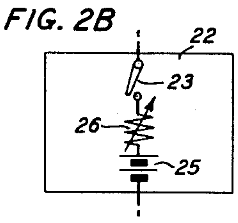
Figure 2C:
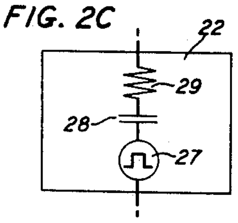

The gating switches 23, shown in Figs. 2A and 2B may comprise any of the switching means well-known in the art such as mechanical or electronic relays. Transistor gates, however, may be operated entirely by pulses. This is illustrated by the modification shown in Fig. 2C. A positive pulse generator 27 in series with an input condenser 28 and resistor 29 is connected to the gating point *g*. By proper control of the amplitude of the gating pulses, any of the aforementioned three transconducting conditions may be obtained and positive pulse, negative pulse, or alternating-current signals may be gated and amplified without undue distortion. For this mode of operation it is desirable that the values of resistor 21 and capacitor 19 be small. If the source 18 is also a source of positive pulses the outputs of source 18 and generator 27 are adjusted so that the output of neither one will drive the transistor into a transconducting state and cause a pulse to appear at the load 20. Only when pulses appear simultaneously from the sources 18 and 26 will a pulse appear at the load 20. Although the negative bias is not disabled or removed from the emitter circuit, most of the negative voltage of battery 16 will appear across resistors 17 and 21 when the transistor is in a transconducting state. When the transistor is in a non-transconducting state, most of the battery 16 voltage appears across the transistor input, due to the large non-transconducting emitter-to-base resistance, the exact values in either case depending on the resistance of resistors 17 and 21 and the "off" and "on" emitter-to-base resistances of the transistor. The operation of the gating point with pulses greatly extends the utility of transistor gates in the field of electronic switching, for example, in communications or in electronic computers.

Figure 2D:
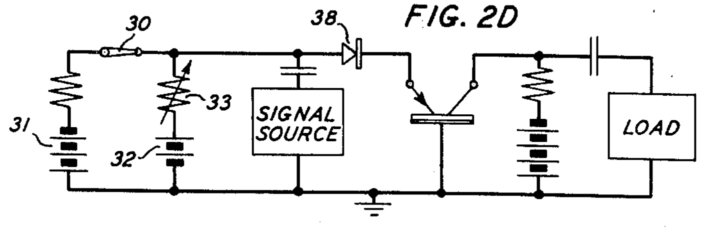

The elemental gate of Fig. 2 has been illustrated in the modification of Figs. 2A and 2B as being turned "on" by operating a make contact. These gates, however, may also be turned "on" by the operation of a break contact as is illustrated in Fig. 2D. When the switch 30 is in its normal "off" condition the negative bias of the battery 31 is sufficient to overcome the positive bias of battery 32 and thus hold the transistor in a non-transconducting state. The gate is turned "on" by opening the switch 30 which disconnects battery 31 and places the transistor in a transconducting state. In particular, for positive pulses, resistor 33 may be eliminated.

Figure 2E:
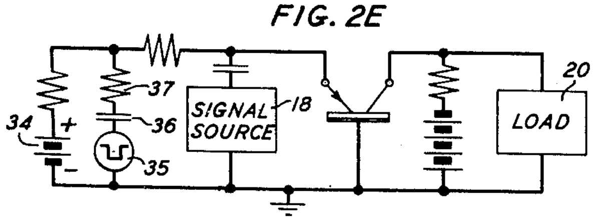

The circuits thus far described have been illustrated as gates which are opened by the operation of a gate control. By slight modification however, they may comprise normally "on" gates which are turned "off" by the operation of a gate control. For example, the gate of Fig. 2E comprises a transistor connected in the normal manner for amplification with the emitter biased positive by battery 34. The gate control means comprise a negative pulse generator 35 in series with an input condenser 36 and resistor 37. The amplitude of the negative pulses is sufficient to decrease the emitter current to a value in the non-transconducting region so that energy from source 18 will not pass to the load 20. Make or break-contact switches may also be utilized in an obvious manner to achieve the same result.

A transistor gate has an inherently high "off/on" ratio due to the rectifier contact which the emitter electrode makes with the block of semiconductive material. If, in a particular transistor or application thereof, the "off/on" ratio is not high enough, the non-transconducting or "off" impedance may be increased without substantially increasing the transconducting or "on" input impedance by connecting one or more diodes in series with the emitter electrode as is illustrated by the diode 38 in Fig. 2D.

Figure 4:
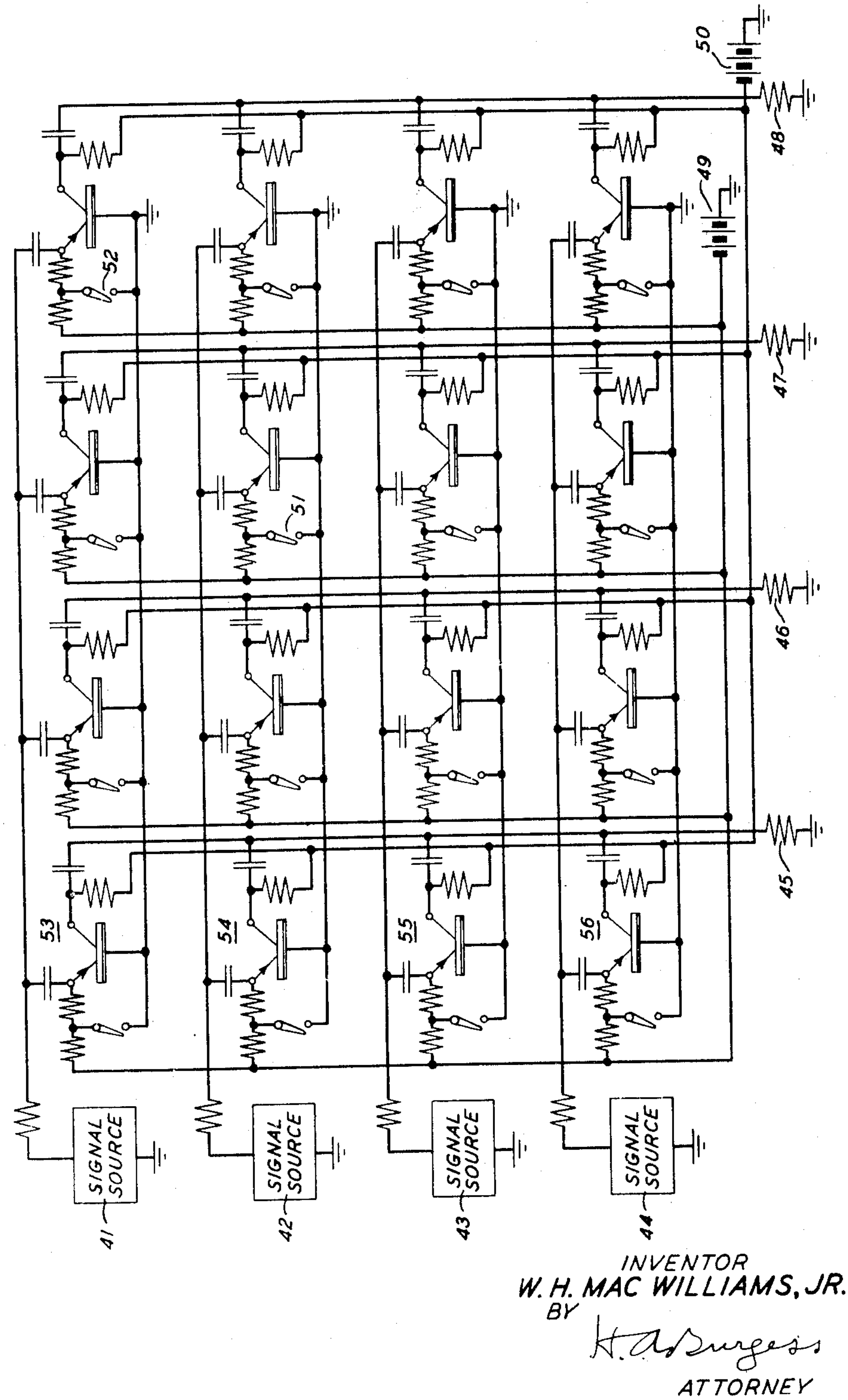
Fig. 4 shows in schematic an $m$ by $n$ amplifying switching matrix comprising $m \cdot n$ individual gates.

The elemental gates as described herein may be expanded into an amplifying gating matrix by arranging a plurality of elemental gates equal in number to the product of the desired number of input and output circuits in rows and columns, one row for each input circuit and one column for each output circuit and connecting, capacitively, the emitter circuits in each row and the collector circuits of each column, respectively in parallel. Referring now to Fig. 4, there is shown an amplifying gating matrix adapted to gate signals from any one of four input sources 41 through 44 to any one of four output circuits 45 through 48. The circuit is an $m$ by $n$ matrix wherein $m$ and $n$ are each equal to four and comprises $m \cdot n$ ("$m$ times $n$") or 16 transistors. The elemental gates are, for example, as shown and described in connection with Fig. 2 as modified by Fig. 2A with the emitters and collectors biased over obvious circuits from the sources 49 and 50. Energy from each of the sources 41 through 44 is uniquely applied to the parallel-connected emitter circuits of one of the rows of transistors and each output circuit is uniquely connected to the parallel-connected collector circuits of one of the columns of transistors.

Assuming for illustrative purposes that the sources 41 through 44 are generators of positive pulses, pulses will be passed from any of the sources to a desired output circuit by selectively operating the gating switch of the gate which comprises the cross-point for that particular source and output circuit so that a correspondence is established therebetween. For example, by operating the switch 51, a pulse from generator 42 will be amplified and gated to output 47. Similarly, an operation of switch 52 will pass and amplify a pulse from generator 41 to output circuit 48, assuming of course that pulses from these generators are present during the times when the switches are closed. With the circuits shown, four simultaneous independent connections are possible. If the matrix were not square, the number of simultaneous independent connections possible would be equal to $m$ or $n$, whichever is smaller. Some dependence may also be introduced into the connections. Thus, it is possible to associate up to $n$ output circuits with any particular input circuit with the connections for the several input circuits independent of each other. For example, output circuits 45, 46, and 47 could be connected to source 41, circuits 46 and 48 could be connected to source 42, circuits 47 and 48 could be connected to source 43, and all four output circuits could be connected to source 44. Similarly, up to $m$ input circuits can be associated with any particular output circuit with the connections for the several output circuits being independent of each other.

The means whereby a particular gate is chosen to be opened and a desired correspondence effected may comprise any of the means known in the art and per se form no part of the present invention.

The matrix shown and described in Fig. 4 is capable of gating and amplifying pulses of microseconds duration which occur at repetition rates of 10 kilocycles or more. By modifying the elemental gates as described in connection with Fig. 2B or Fig. 2C, the matrix would be capable of gating alternating-current signals, for example, speech signals. The sources 41 through 44 and the output circuits 45 through 48 of Fig. 4 may therefore be connected to telephone subscribers and four simultaneous conversations could be gated and amplified. With the modification of Fig. 2B, the connections could be maintained continuously as long as desired; for example, for the total length of a telephone conversation.

By utilizing time division multiplex techniques, the $m$ by $n$ matrix of Fig. 4 may be reduced to a matrix of only $m+n$ transistors as is shown in Fig. 5. Four sources 61 through 64 supply energy which is to be channeled, as desired, to any of three output circuits 65 through 67. Each of the sources is connected to supply its energy to one of four input gates 68 through 71 and each of the output circuits is connected to receive energy from one of three output gates 72 through 74. The transistor gates are normally turned "off" by the negative bias which is applied to their respective emitter electrodes over obvious paths from the battery 75. The input energy from the four sources is recurrently sampled by the distributor 76 which applies a grounding impulse from ground 77 to the gating point of each input gate in turn and hence turns "on" the gates one at a time by placing them in a transconducting state. The collector circuits of the input transistors are connected to a common output 78 which applies the amplified energy from the four sources 61 through 64, which is now multiplexed in time division, to the emitter circuits of the output transistors 72 through 74. The distributor 79 opens the output gates in a manner similar to the operation of distributor 76 and serves to select the desired output channel for a particular source by the order in which the output gates are opened. The distributors 76 and 79 may be synchronized by the synchronizer 80 or may comprise a single unit. The channeling may be rapidly changed by changing, in an obvious manner, the order that either or both the input and output gates are opened.

Whereas in a matrix of $m \cdot n$ cross-points, up to $m$ or $n$, whichever is smaller, cross-points can be established simultaneously, in the matrix of $m+n$ cross-points, only one cross-point is established at any one time. However, up to the smaller of $m$ or $n$ connections are effectively made during any given period of time even with the $m+n$ matrix by the use of time division techniques. A matrix of only $m+n$ transistors of course represents a considerable saving over a matrix of $m \cdot n$ transistors, particularly in the larger arrays. The $m+n$ matrix is not limited to the particular type of elemental gate shown in Fig. 5. For example, the distributors 76 and 79 could apply either a positive voltage or positive pulses to the gating points for reasons previously described.

Simple logical equations may be represented electronically by means of transistor gates. Briefly, a logical equation expresses the validity of a given proposition in terms of the validity of other given propositions. These propositions are binary in nature, i. e., they may have one of two conditions, for example, on or off, open or closed, true or false. They therefore deal with discrete rather than continuous functions.

Such equations may have "and" or "or" properties, or both. "And" properties denote that more than one proposition need be valid; "or" properties denote alternatives. In Boolean form, "and" properties are expressed as a summation, "or" properties as a product. For example, a proposition stating that in a network of relays, relay A will be operated if relay B is operated "and," if either relay C "or" relay D is also operated, would be expressed $$A = B + CD$$

The proposition just stated has both "and" and "or" properties as may readily be seen.

It is frequently desired to represent a given equation electronically to make, for example, the appearance of a pulse or the closing of a contact dependent on several other conditions. The elemental gate illustrated by Fig. 2 is a logical two-term "and" circuit. For example, if the source 18 is a pulse generator, a pulse will be present at the load 20 if a pulse is present at the emitter "and" if the transistor is in a transconducting state. More specifically, with the modification of Fig. 2A a pulse will be present at the load 20, if a pulse is present at the emitter 12 "and" if the switch 23 is closed. Paralleling the output circuits of elemental gates as illustrated by the matrix of Fig. 4 results in a logical "or" circuit. For example, assuming the sources 41 through 44 to be pulse sources, a pulse will be present in output circuit 45 if a pulse appears in the output of transistor gate 53, "or" if a pulse appears in the output of gate 54, "or" in the output of gate 55, "or" in the output of gate 56. Since the elemental gates have "and" properties, the matrix has both "and" and "or" properties. In a similar manner, the matrix of Fig. 5 has both "and" and "or" properties, the "or" property resulting from the connection of the collector circuits of the input transistors 68 through 71 to the common output 78.

A characteristic of the "and" circuit illustrated in Fig. 2 is the high input impedance of the gating point. It is thus possible to obtain "and" circuits of more than two terms by connecting two or more transistors in tandem, that is, the collector circuit of one gate is connected to the emitter circuit of the next, since a second transistor will reflect only a small load into the collector circuit of the preceding transistor.

A three-term "and" circuit is shown by way of example in Fig. 6 and comprises two elemental gates 81 and 82 similar to those described in connection with Figs. 2 and 2A. The gates are placed in a non-transconducting state by the batteries 83 and 84. Input circuits $P_1$ and $P_2$ are provided for applying pulses to the inputs viz., the emitter electrodes, of the two gates. As previously explained, a pulse will be present in the output of gate 81 if a positive pulse is present at $P_1$ "and" if switch 85 is closed. The amplified pulse appears as a voltage drop across resistor 86 and is applied to the gating point $g$ of gate 82. This voltage drop is of proper polarity to oppose the voltage of battery 84 and, if sufficient in magnitude, allows condenser 87 to discharge and places transistor 82 in a transconducting state. By proper choice of resistors, this gating can be accomplished with only a negligible signal appearing in the output circuit of transistor gate 82 in the absence of a pulse at $P_2$. A pulse will be present at the load if gating switch 85 is closed, "and" if a pulse is present at $P_1$ "and" if a pulse is present at $P_2$; and no signal will appear unless all three of these conditions are met.

Figure 6:
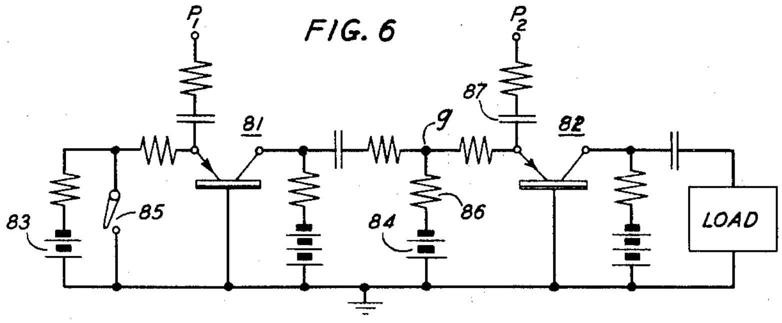
Figs. 6 and 6A illustrate an extension of the logical two-term "and" circuit of Fig. 2 to a three-term "and" circuit.
Figure 6A:
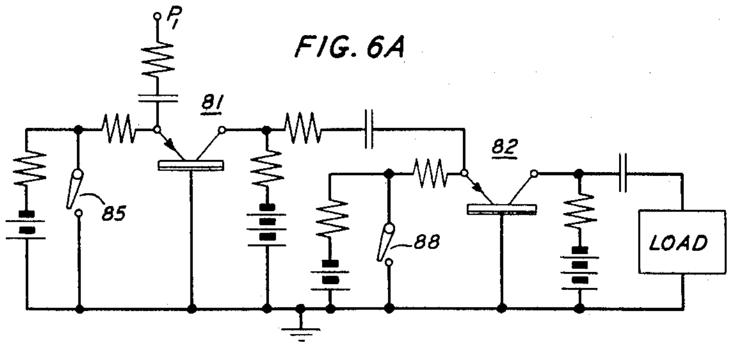

The circuit of Fig. 6 may obviously be expanded to more terms by adding more transistors, one for each additional term. Since the first transistor gate of a cascade is the equivalent of two terms, the total number of transistors needed to express $n$ terms is $(n-1)$. Many other modifications are also possible. For example, the output of the first transistor may be applied directly to the emitter of the second transistor with some other means of placing the second transistor in a transconducting state. This is illustrated in Fig. 6A. A pulse will be present at the load if switch 85 is closed, "and" if a pulse is present at $P_1$ "and" if switch 88 is closed. "Or" properties may be added to multiterm "and" circuits by paralleling output circuits of several "and" circuits in a manner similar to that illustrated by the matrix of Fig. 4.

Instead of gates or electronic equivalents of logical equations, the circuits illustrated by Fig. 6 may be thought of as $n$-term coincidence circuits wherein the presence of a pulse in the load circuit depends on the coincidence or simultaneous presence of $n$ predetermined conditions, the conditions controlling the presence of the pulses or the closing of the gating switches.

Figure 7:
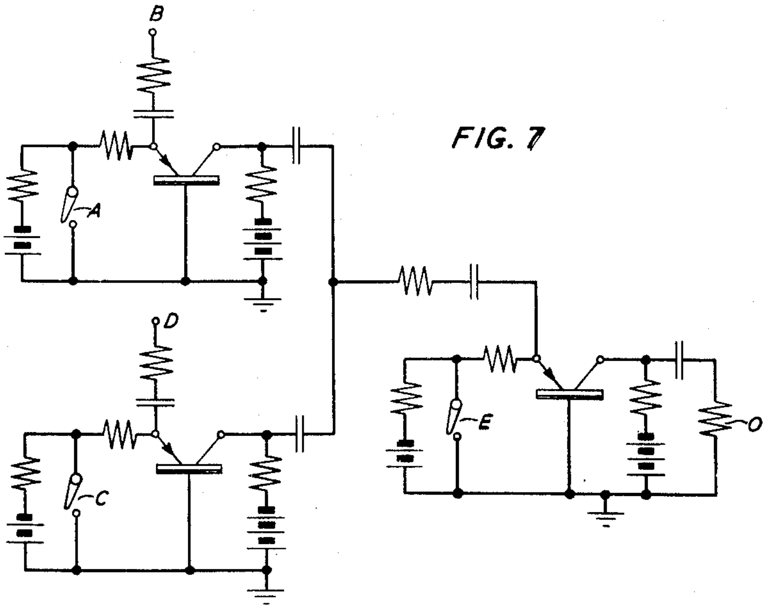
Fig. 7 illustrates an electronic equivalent of a given logical equation.

Transistor gates are a flexible means for readily simulating a given logical equation. For example, given the equation:

$$O=(A+B)\ (C+D)+E$$

an electronic equivalent thereof may readily be obtained with three elemental gates as shown in Fig. 7 where A, C, and E represent, respectively, the closing of switches A, C and E, and B and D represent the presence of a pulse at B and D respectively. A pulse will be present at the output O, if switch A is closed "and" a pulse is present at B, "or," if switch C is closed "and" a pulse is present at D; "and" if switch E is closed.

In the cases in which a contact closure causes a gate to be turned "on," it should be noted that (1) the contact is not required to pass short pulses, and (2) that the resistance of the contact may be appreciable without adversely affecting the operation of the gate.

The specific embodiments disclosed and described herein have been by way of illustration only. Numerous other embodiments will readily occur to one skilled in the art without departing from the spirit or scope of the invention.

What is claimed is:

1. An amplifying electronic switch which comprises a transistor having an emitter electrode, a collector electrode, and a base electrode, means to apply input energy to said emitter, means to bias said transistor to a non-transconducting state to place said switch in the "off" condition, and means to place said switch in the "on" condition which comprises means to change said bias sufficiently to render said transistor transconducting.

2. An amplifying electronic gate which comprises a transistor having an emitter electrode, a collector electrode and a base electrode, means to apply input energy to be gated to said emitter, output means connected to said collector, biasing means connected to said emitter to cause sufficient normal negative current to flow in the emitter circuit of said transistor so that the energy applied to said emitter can effect substantially no change in the current flowing in said collector, and gate control means connected to said emitter to increase in a positive sense the current flowing in said emitter from its normal negative value so that said energy will appear in amplified form as a change in the current flowing in said collector.

3. The combination according to claim 2 wherein said gate control means increase the said emitter current in a positive sense to a value such that further increases in a positive sense and increases only in a positive sense of said emitter current will effect an appreciable change in said collector current.

4. The combination according to claim 2 wherein said gate control means increase the said emitter current in a positive sense to a value such that changes in a negative sense from said value will cause an appreciably greater change in said collector current than would changes in a positive sense from said value.

5. The combination according to claim 2 wherein said gate control means increase the said emitter current in a positive sense to a value such that equal changes in said emitter current from said value in either a positive or a negative sense within predetermined limits will effect sensibly equal changes in said collector current.

6. The combination according to claim 2 wherein said gate control means comprises means to disable said biasing means.

7. The combination according to claim 2 wherein said gate control means comprises a source of positive pulses.

8. The combination according to claim 7 wherein the amplitude of said pulses is insufficient to cause an appreciable change in said collector current in the absence of said input energy.

9. The combination according to claim 2 wherein said gate control means comprises a source of positive voltage and switching means to connect said source to said emitter.

10. A coincidence circuit which comprises a transistor having an emitter electrode, a collector electrode, and a base electrode, means connected to said emitter to bias said transistor to a non-transconducting state, a first and a second source of pulses each connected to said emitter, and effective jointly to place said transistor in a transconducting state, and an output circuit connected to said collector.

11. The combination in accordance with claim 10 wherein said pulses are of positive polarity and individually of an amplitude insufficient to produce an appreciable change in the current flowing in said collector when the said transistor is so biased.

12. An amplifying electronic gate having an input and an output which comprises a block of semiconductor material, said input comprising a first electrode making rectifier contact with the surface of said block, said output comprising a second electrode making rectifier contact with said block, a third electrode making contact with another part of said block, means connected between said first and third and between said second and third electrodes to bias said first and second electrodes in their high resistance direction and means connected to said first electrode to controllably decrease the input resistance of said first electrode.

13. A coincidence circuit for applying an electrical impulse to a load only upon the simultaneous presence of $n$ conditions where $n$ is an integer greater than 2 which comprises $n-1$ transistors each having an emitter electrode and a collector electrode, means connecting said transistors in tandem, means connecting said load to the $(n-1)^{st}$ of said transistors, biasing means connected to each of said transistors to render the transistor to which it is connected non-transconducting, a plurality of pulse sources each connected uniquely to one of said emitters, and means connected to the emitter of the first of said transistors to render said first transistor transconducting wherein $(n-1)$ of said conditions are the presence of pulses at each of said emitters and the other of said conditions is the transconducting state of said first transistor.

14. A coincidence circuit which comprises a plurality of transistors each having an emitter electrode and a collector electrode, means connecting said transistors in tandem, means connected to each of said emitters to place the transistor of which the emitter is an electrode in a non-transconducting state, means connected to each of said emitters to controllably place the individual transistors in a transconducting state, a plurality of energy sources each uniquely connected to one of said transistors, and output means connected to the collector of the last of said tandem connected transistors.

15. The combination in accordance with claim 14 wherein the means for each of said tandem connected transistors except the first which place the transistors in a transconducting state comprise means connected to the collector of the preceding transistor to derive a voltage in response to a change of collector current in said preceding transistor.

16. An amplifying electronic gate comprising a plurality of transistors each having an emitter electrode and a collector electrode, means connected to each of said transistors to place the transistor to which it is connected in a non-transconducting state, a plurality of energy sources each connected uniquely to one of said emitters, means to gate energy from at least one of said sources to a load which comprise means in a first transistor to place said first transistor in a transconducting state, means in each of said transistors other than a second transistor to derive a voltage in response to an appreciable change in collector current therein, means to apply each of said voltages uniquely to the emitter of a transistor other than the one deriving the voltage and other than said first transistor, and means connecting said load to the collector of said second transistor.

17. An amplifying gating matrix for gating energy from any of a plurality of sources $m$ to any of a plurality of load circuits $n$ comprising $m \cdot n$ transistors each having an emitter electrode and a collector electrode, means connecting each of said sources uniquely to the emitter circuits of a row of $n$ of said transistors, means connecting the emitter circuits of each row of transistors in parallel for energy from said sources, means connecting each of said load circuits uniquely to the collector circuits of a column of $m$ of said transistors, no two of which $m$ transistors have their emitter circuits connected in parallel for energy from said sources, means connecting the collector circuits of each column of transistors in parallel for energy from said sources, means connected to each of said transistors to place the transistor to which it is connected in a transconducting state, and control means for selectively placing any of said transistors in a transconducting state.

18. An amplifying gating matrix for associating a plurality of $m$ circuits with a plurality of $n$ circuits, where $m$ and $n$ are integers, which comprises $m \cdot n$ transistors, means connecting each of said sources uniquely to the emitter circuits of a row of $n$ of said transistors, means connecting the emitter circuits of each row of transistors in parallel for energy from said sources, means connecting each of said load circuits uniquely to the collector circuits of a column of $m$ of said transistors, no two of which $m$ transistors have their emitter circuits connected in parallel for energy from said sources, means connecting the collector circuits of each column of transistors in parallel for energy from said sources, means connected to each of said transistors to place the transistor to which it is connected in a transconducting state, and means for selectively establishing transconductive paths from any of said $m$ circuits to any of said $n$ circuits which comprise means connected to the emitter circuits of each of said transistors to place up to the number of $m$ or $n$, whichever is smaller, of said transistors in a transconducting state.

19. An amplifying gating matrix for connecting, one at a time, any of $m$ input circuits to any of $n$ output circuits which comprises $m$ input transistors and $n$ output transistors, means connecting each of said $m$ circuits uniquely to the emitter circuit of one of said input transistors, means connecting the collector circuits of said input transistors to a common output, means connecting said output to the emitter circuits in parallel of said output transistors, means connecting each of said $n$ circuits uniquely to the collector of one of said output transistors, means connected to each of said transistors for placing the transistor to which it is connected in a non-transconducting state, a first control means for selectively placing one of said input transistors in a transconducting state and a second control means to selectively place one of said output transistors in a transconducting state whereby a transconductive path may be established from any one of said $m$ circuits to any one of said $n$ circuits.

20. An electronic representation of a logical equation having "and" and "or" properties which comprises a first and a second transistor each having an emitter electrode and a collector electrode, means connected to the said emitters to place the said transistors in a non-transconducting state, control means connected to each of said emitters to place the transistor to which it is connected in a transconducting state upon the presence of a predetermined condition, means connected to each of said emitters for applying energy to each of said transistors upon the presence of another predetermined condition, means connecting the collector circuits of the said transistors in parallel, and an output circuit connected to the said parallel connected collector circuits.

21. A multiterm coincidence circuit which comprises a first and a second transistor each having an emitter electrode and a collector electrode, means connected to each of said emitters to place said transistors in a non-transconducting state, means connecting the collector circuit of said first transistor to the emitter circuit of said second transistor, means connected to the emitter circuits of each of said transistors to place them in a transconducting state upon the presence of predetermined conditions, means to apply energy to the emitter circuits of each of said transistors upon the presence of other predetermined conditions and output means connected to the collector circuit of said second transistor.

22. The combination in accordance with claim 21 wherein the collector circuit of said first transistor is connected to the gating point of said second transistor whereby the means to place said second transistor in a transconducting state comprises the output of said first transistor when the latter is in a transconducting state.

23. The combination in accordance with claim 21 wherein the means to apply energy to the emitter circuit of said second transistor comprises said first transistor.

WALTER H. MACWILLIAMS, JR.

REFERENCES CITED

The following references are of record in the file of this patent:

UNITED STATES PATENTS

| Number | Name | Date |
|---|---|---|
| 2,531,076 | Moore | Nov. 21, 1950 |